United States Patent

[11] 3,607,329

| [72] | Inventor | Serop Manjikian<br>Del Mar, Calif. |
|---|---|---|
| [21] | Appl. No. | 818,397 |
| [22] | Filed | Apr. 22, 1969 |
| [45] | Patented | Sept. 21, 1971 |
| [73] | Assignee | The United States of America as represented by the Secretary of the Interior |

[54] CELLULOSE ACETATE BUTYRATE SEMIPERMEABLE MEMBRANES AND THEIR PRODUCTION
10 Claims, No Drawings

[52] U.S. Cl..................................................... 106/177,
 106/182, 106/189, 210/500, 264/49, 264/217
[51] Int. Cl...................................................... B29d 27/04,
 C08b 21/06, C08b 27/42, C08b 27/44, C08b 27/58
[50] Field of Search........................................... 264/41, 49,
 217; 106/177, 189, 196, 178; 210/500

[56] References Cited
UNITED STATES PATENTS

| 3,364,288 | 1/1968 | Loeb.............................. | 264/49 |
|---|---|---|---|
| 3,412,184 | 11/1968 | Sharples et al................. | 264/41 X |
| 3,432,584 | 3/1969 | Cannon et al.................. | 264/41 X |
| 3,494,780 | 2/1970 | Skiens........................... | 264/41 X |

OTHER REFERENCES

U.S. Office of Saline Water, " Reverse Osmosis for Water Desalination." By U. Merten et al., General Dynamics Corp. Research and Development Progress Report No. 208. September 1966, pp. 140– 144. copy in 264– 49.

*Primary Examiner*—Philip E. Anderson
*Attorneys*—Ernest S. Cohen and William S. Brown ABSTRACT: Semipermeable membranes are produced by casting a solution consisting essentially of cellulose acetate butyrate, triethyl phosphate, a flux promoter and an organic solvent into a film, and subsequently gelling the film by immersion in water. The membranes of the invention find particular utility in separation of solutes from solutions by osmosis or reverse osmosis.

CELLULOSE ACETATE BUTYRATE SEMIPERMEABLE MEMBRANES AND THEIR PRODUCTION

This invention relates to semipermeable membranes and their production. Such membranes are particularly useful in apparatus for separating solutes from solutions by osmosis or reverse osmosis.

Semipermeable membranes, employed in reverse osmosis systems for separating solutes from solutions, are rated by two important characteristics, namely, flux, and salt rejection or selectivity. Flux is the amount of liquid flow-through generally defined as gallons per square foot of membrane per day. Selectivity is often given as that percentage of the original salt content of the solution held back or rejected by the membrane.

Cellulose acetate semipermeable membranes are normally used in reverse osmosis processes. They are produced by casting a mixture or solution composed of cellulose acetate, a flux promoter such as magnesium perchlorate or formamide, and acetone to form a thin film. After allowing a short period of time for evaporation of a part of its volatile constituents, the so-produced film is quenched by immersion in water to gel the cellulose acetate and leach out water soluble constituents. After quenching, the semipermeable cellulose acetate membrane film is characterized by high flux but low selectivity. In order to increase selectivity the membrane is heat treated, conveniently by immersion in hot water. This heat treating step raises the selectivity considerably while the flux is only slightly lowered. A representative cellulose acetate membrane after heat treatment may show flux of about 20 gallons per square foot per day and selectivity of about 97 percent when tested using an aqueous feed solution containing 5,000 p.p.m. NaCl under pressure of 600 p.s.i.g. Working on sea water as feed at 1,200 p.s.i.g., a cellulose acetate membrane will show about the same selectivity but a reduced flux.

Membranes of higher selectivity, together with a practical flux, would be a valuable improvement. In sea water treatment, for example, a selectivity of about 99 percent or better is required to reduce the original sea water salt content to a potable water salt content of less than a few hundred parts per million. For treating impure solutions of lower total solids content, such as brackish water and municipal supply water, a high selectivity membrane provides the capability for producing extremely pure product water, often containing only a few parts per million of dissolved salts.

In addition, any simplification of present membrane production methods would be economically and technologically advantageous.

Summarized briefly, this invention contemplates production of a semipermeable membrane in the form of a thin film of cellulose acetate butyrate. The membrane is characterized by a flux of at least 7 gallons per square foot per day and selectivity of at least 98.5 percent and often as high as 99.8 percent, when tested using an aqueous feed solution containing 5,000 p.p.m. NaCl at a pressure of 600 p.s.i.g. The membrane is produced by casting a solution consisting essentially of cellulose acetate butyrate, triethyl phosphate, at least one flux promoter, and an organic solvent for cellulose acetate butyrate, into a film. After casting, the film is gelled by immersion in water, preferably cold water. The so-formed membrane need not be heat treated; in the unheat-treated condition it will show acceptable flux and very high selectivity.

Optionally, to aid in formation of the membrane by partial gellation to form an active surface skin, some time may be allowed after casting and before water immersion for removal by evaporation of part of the volatile constituents in the cast film. If the film is immersed directly or substantially directly after casting, the initial partial gellation and skin formation is accomplished by solvent removal under these conditions followed by complete gellation on continued immersion.

Cellulose acetate butyrate suitable for preparing membrance according to this invention is available commercially having various proportions of combined butyryl and acetyl groups, and it can be obtained in grades identified by a viscosity rating determined by a standard test, ASTM method D1343–54T. Grades having viscosities of from about 10 seconds to about 50 seconds are suitable for use in the method of this invention. A suitable cellulose acetate butyrate containing about 17 percent of combined butyryl and about 29.5 percent combined acetyl and having 15 second viscosity is marketed by Eastman Chemical Products Inc. and identified as type EAB–171–15.

Triethyl phosphate is an essential ingredient of the casting solution. Its precise function is obscure; it appears to assist in promotion of flux and also to act as a secondary solvent. For these reasons it is listed separately as a casting solution ingredient.

The term flux promoter is intended to include those compounds and materials that promote or induce increased flux in cellulosic materials. Their precise action is not particularly well understood and they have also been referred to as modifying agents and pore-producing agents. These include for the purpose of this invention a combination of glycerol and n-propanol, and a combination of glycerol and lactic acid. The preferred flux promoter for producing membranes according to this invention is a combination of glycerol to n-propanol about 1 to 3 to about 1 to 8 by weight; lactic acid may replace n-propanol in the casting solution with some slight increase in flux and decrease in selectivity.

The organic solvent employed in the casting solution may be selected from those in which cellulose acetate butyrate is soluble to provide desirable viscosity. These will include acetone, methyl ethyl ketone, methyl acetate, ethyl acetate 95 percent, methylene chloride, ethylene chloride, dioxane, dimethyl formamide, dimethyl sulfoxide and pyridine. Acetone is preferred.

The casting solution should comprise the following proportions of the above mentioned ingredients, all percentages being be weight:

Cellulose acetate butyrate—about 15 to about 25 percent
Triethyl phosphate—about 15 to about 30 percent
Flux promoter —about 6 to about 24 percent
Solvent—about 35 to about 65 percent Using glycerol and n-propanol as a combination flux promoter, the glycerol should be from about 1.5 percent to about 6 percent and the n-propanol from about 4.5 percent to about 18 percent. Lactic acid, if employed in place of n-propanol, should be from about 4.5 percent to about 18 percent.

A preferred casting solution consists essentially of:
Cellulose acetate butyrate–about 22 percent
(Type EAB–171–15)
Triethyl phosphate —about 25 percent
Glycerol —about 2 percent
n-Propanol —about 6 percent
Acetone —about 45 percent In addition to the ingredients specifically listed, the casting solution may contain diluents and other additives which do not appreciably affect the basic nature of the solution or the membrane cast from it. Such additions may be for the purpose of viscosity or membrane thickness control, for example.

The amount of the ingredients listed above are critical to obtain desired membrane properties as described.

The cellulose acetate butyrate content should range between about 15 and about 25 percent to provide a proper amount of basic film-forming ingredient in the casting solution. The cellulose acetate butyrate content within the limits described is advantageous also to provide with the other ingredients a mixture or solution of viscosity suitable for spreading or casting to form the film.

The triethyl phosphate content should be between about 15 and about 30 percent. Less than 15 percent triethyl phosphate results in low flux in the membrane even though an otherwise sufficient percentage of flux promoter is present. More than 30 percent triethyl phosphate produces no additional benefit.

The flux promoter should be present within the limits of about 6 percent to about 24 percent to provide adequate flux in the membrane. Less than 6 percent flux promoter will result in a membrance with too low flux while more than 24 percent appears to be of no additional benefit. When glycerol and n-propanol are employed as a combination flux promoter best results are obtained when the glycerol to n-propanol ratio is from about 1 to 3 to about 1 to 8. Lactic acid may be substituted for n-propanol, as previously described.

After proportioning, solution ingredients are thoroughly mixed together, using convenient and conventional apparatus. The film is cast by spreading over a surface to form a film between about 0.005 and 0.015 inch thick. This may be accomplished using a doctor blade working over the surface of a drum or flat plate, or a bob traveling longitudinally inside a tube to produce a tubular film on the inner surface of the tube; or suitable apparatus to spread a film on the outside of a porous rod or polygonal body. After the film is formed, a short period of time, up to about 90 seconds, may be allowed for evaporation of part of the volatile constituents in the cast film, and then the film is quenched by immersion in water at a temperature of 32° to 78° F., preferably initially at about 33° to 36° F. After about 20 minutes or longer in the quench water, the membrane film is ready for use; no heat treatment is necessary nor is it generally desirable.

The time allowed for evaporation of part of the volatile constituents of the cast film has an effect on the properties of the membrane. Generally this time should not exceed 90 seconds, and in some cases it may be very short. For casting tubular membranes a short evaporation period may be found to produce excellent membrane properties. In the case of flat membranes an evaporation period of about 60 seconds before immersion in water has been found advantageous.

The properties that characterize the membrane are listed as follows:

1. Very high selectivity of at least 98.5 percent and often approaching 99.9 percent.
2. Acceptable flux, not extremely high but at least about 7 gallons per square foot per day. Both flux and selectivity determined using a 5,000 p.p.m. NaCl solution at 600 p.s.i.g.
3. The membrane is asymmetric having a thin active skin on one side; but it is not direction sensitive and feed solution can be applied to either side. This property of the cellulose acetate butyrate membrane is different from a cellulose acetate membrane which is direction sensitive and possesses permselectivity only when feed solution is applied to the active skin side of the membrane. When feed solution is applied at low pressure to the back side of the cellulose acetate butyrate membrane (that is the side other than the active surface side) flux and selectivity are not much different from these properties obtained when the feed solution flow is in the normal direction, that is across the active surface side. At higher operating pressures, however, probably due to boundary layer salt buildup in the membrane pores, the efficiency of the membrane is reduced when feed solution is passed across the back side of the membrane.
4. Cellulose acetate butyrate will hydrolyze less and resist compaction under pressure better than cellulose acetate. Therefore, a cellulose acetate butyrate membrane should have longer life.
5. The cellulose acetate butyrate membrane will reject ions and compounds not efficiently rejected by cellulose acetate membrane, for example, nitrates and borates.

The cellulose acetate butyrate membrane of this invention comprises, structurally, a thin skin on one side which is sufficiently dense to be permselective, that is, it will pass certain ions and compounds and reject others, and a more porous and thicker substructure. The bulkier molecule from which it is formed results in a somewhat thicker active skin than is usually present in a cellulose acetate membrane. This thicker skin may account for its higher selectivity and somewhat lower flux. The membrane contains, under normal conditions and in operation, a large percentage of water absorbed in its structure. This may amount to from about 30 percent to about 70 percent. To determine comparative water content it is convenient to dry a membrane sample in an oven maintained at about 95° C., and to measure the water loss by weighing before and after drying. A typical membrane will be found to contain about 60 percent water by drying test. This will not include water bound into the chemical structure but will indicate the absorbed water which can be readily volatalized and determined.

The cellulose acetate butyrate membrane, like a cellulose acetate membrane, should be maintained in a humid or wet atmosphere and should not be allowed to dry out before use. If allowed to dry out, an irreversible change in structure takes place and semipermeable properties are adversely affected or entirely lost. This does not apply, however, to specially formulated membranes which contain substantially less than normal water and which are designed to be stored and handled as dry films.

Specific examples of the production of cellulose acetate butyrate membranes follow.

EXAMPLE 1

The following ingredients were thoroughly mixed in a rolling jar mill; all parts are be weight:
Cellulose acetate butyrate (EAB 171–15)     22 parts
Triethyl phosphate     25 parts
Glycerol     2 parts
n-propanol     6 parts
Acetone     45 parts The mixture or casting solution was cast into 6 × 6 membranes using a flat glass plate equipped with 0.01-inch thick side runners and drawing the solution down the plate with a doctor blade. The film on the glass plate was exposed to the atmosphere for 60 seconds and was then immersed in water, initially at 33° F., for about 1 hours, the quench water temperature rising gradually during the immersion period. The membrane was ready for use without heat treating. A 2-inch circle was cut from the flat membrane so produced and placed in a laboratory high pressure cell for testing. A salt solution containing 5000 p.p.m. NaCl was used as feed and was pumped into the cell at a pressure of 600 p.s.i.g. Purified product water passing through the membrane during a predetermined time period was collected and measured. Calculations converted the results to gallons per square foot per day. The purified product was was tested for conductance, and micromhos/cm. converted to parts per million NaCl. Selectivity was calculated as the percentage of NaCl in the original feed solution rejected, or held back by the membrane. Results were:
Flux     8 gal./sq.ft.day
Product water salt content     20 p.p.m.
Membrane selectivity     99.6 percent

EXAMPLE 2

In this example the casting solution contained lactic acid and had the following formulation; all parts by weight:
Cellulose acetate butyrate (EAB 171–15)     22 parts
Triethyl phosphate     25 parts
Glycerol     2 parts
Lactic acid     6 parts
Acetone     45 parts The solution was cast into a membrane film and tested in the same manner described for example 1. The membrane was not heat treated. Results of tests using 5,000 p.p.m. NaCl feed at 600 p.s.i.g. were:
Flux 14 gal./sq.ft.day
Product water salt content 170 p.p.m.
Membrane selectivity 98.6 percent The selectivity obtained in the membrane of example 1 is extremely high, the 99.6 percent indicating almost perfect salt rejection. The selectivity of the membrane of example 2 is slightly lower, but even so it is higher than the selectivity generally obtained with heat treated cellulose acetate membranes.

EXAMPLE 3

In this example, the casting solution contained cellulose acetate butyrate of 40 seconds viscosity and had the following formulation; all parts by weight:

Cellulose acetate butyrate (EAB 171–40)  21 parts
Triethyl phosphate  22 parts for
Glycerol  2 parts
n-propanol  6 parts
Acetone  49 parts The solution was cast into a membrane film and tested in the same manner described for example 1. The membrane was not heat treated. Results of tests using 5,000 p.p.m. NaCl feed at 600 p.s.i.g. were:
Flux  9.1 gal./sq.ft.day
Product water salt content 42 p.p.m.
Membrane selectivity 99.2 percent

EXAMPLE 4

In this example the glycerol to n-propanol ratio was 1 to 6 compared to 1 to 3 in example 1. The formulation was:
Cellulose acetate butyrate (EAB 171–15)  20.7 parts
Triethyl phosphate  23.6 parts
Glycerol  1.9 parts
n-Propanol  11.3 parts
Acetone  42.5 parts The solution was cast into a membrane film and tested in the same manner described for example 1, except that a 30 second evaporation period was allowed after casting and before water immersion. The membrane was not heat treated. Results of tests using 5,000 p.p.m. NaCl feed at 600 p.s.i.g. were:
Flux  6.8 gal./sq.ft.day
Product water salt content  49 p.p.m.
Membrane selectivity  99 percent Another test was run similar to that described above except that 60 second evaporation period was used instead of 30 seconds. Results showed:
Flux  7.0 gal./sq.ft.day
Product salt  49 p.p.m.
Membrane selectivity 99 percent The high selectivity of the membrane produced according to this invention is advantageous for a variety of purposes. It enables a substantially greater percentage of dissolved salts to be separated from the feed water and this, of course, is extremely significant when treating raw water which contains high salt content, such as sea water which ordinarily contains about 35,000 p.p.m. of total dissolved solids. The comparative selectivity expressed as percent does not indicate the product water salt content directly and this can be important. For example, a conventional cellulose acetate membrane having selectivity of 97 percent can produce product water of 150 p.p.m. from 5,000 p.p.m. brackish water while a cellulose acetate butyrate membrane of 99.8 percent selectivity can produce product water of only 10 p.p.m. from the same brackish water. Such a low residue, actually indicating almost complete removal of dissolved solids, can be of critical significance when treating, for example, radioactive waster solutions.

Ability to separate ions other than chloride is an important attribute of cellulose acetate butyrate membranes. Separation of nitrates and borates can be accomplished to a degree not approached by cellulose acetate membranes. Separation of nitrates from potable water and water used for production of soft drinks and other beverages, for example, is of serious interest from a health standpoint, since nitrates can be injurious to infants. Boron compounds are of concern in agriculture and their removal by a reverse osmosis process could be of considerable value.

Heat treatment has heretofore been necessary to raise the selectivity of cellulose acetate semipermeable membranes to a useful level. But heat treatment has not been able to provide cellulose acetate membranes with much above 97 percent selectivity (measured as previously described), without the disastrous loss of flux. Cellulose acetate butyrate membranes according to this invention, on the other hand, have very high selectivity without the need for heat treatment, and a complete processing step is eliminated.

What is claimed is:

1. A method for producing a semipermeable membrane in which a membrane-forming composition is cast into a thin film, and said film is then immersed in water, wherein the improvement comprises employing as the membrane-forming composition a casting solution comprising by weight:
    a. cellulose acetate butyrate in amount from about 15 percent to about 25 percent;
    b. triethyl phosphate in amount from about 15 percent to about 30 percent;
    c. at least one flux promoter selected from the group consisting of a combination of glycerol and n-propanol and a combination of glycerol and lactic acid in amount from about 6 percent to about 24 percent; and
    d. an organic solvent for said cellulose acetate butyrate.

2. A method according to claim 1 in which the cellulose acetate butyrate in (a) contains about 17 percent combined butyryl groups and about 29.5 percent combined acetyl groups.

3. A method according to claim 1 in which the cellulose acetate butyrate in (a) has a rated viscosity between about 10 and 50 seconds by ASTM method D–1343–T.

4. A method according to claim 1 in which the flux promotor in (c) comprises in combination glycerol in amount from about 1.5 percent to about 6 percent and n-propanol in amount from about 4.5 percent to about 18 percent.

5. A method according to claim 1 in which the flux promoter in (c) comprises in combination glycerol in amount from about 1.5 percent to about 6 percent and lactic acid in amount from about 4.5 percent to about 18 percent.

6. A method according to claim 1 in which the organic solvent in (d) is acetone.

7. A method according to claim 1 in which the casting solution comprises:
    a. cellulose acetate butyrate of about 17 percent combined butyryl groups and about 29.5 percent combined acetyl groups and viscosity about 15 seconds by ASTM method D–1343–54T, in amount about 22 percent;
    b. Triethyl phosphate in amount about 25 percent;
    c. glycerol in amount about 2 percent;
    d. n-propanol in about 6 percent; and
    e. acetone in amount about 45 percent.

8. A method according to claim 1 in which a time up to about 90 seconds is allowed for removal by evaporation of part of the volatile constituents of said film before immersion in water.

9. A method according to claim 8 in which a time of about 60 seconds is allowed for removal by evaporation of part of the volatile constituents of said film before immersion in water.

10. A semipermeable membrane made by the method of claim 1.